June 24, 1958 — L. J. BRANCATO — 2,839,823
INSERTING TOOL FOR PUSH-IN INSERTS
Filed May 25, 1955
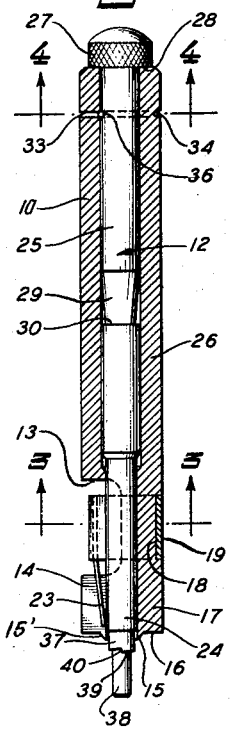
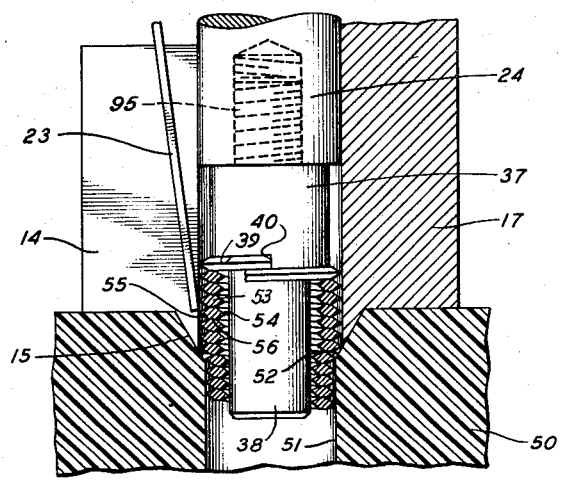
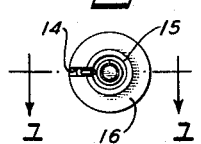
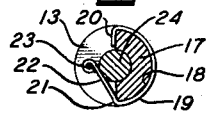
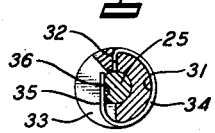
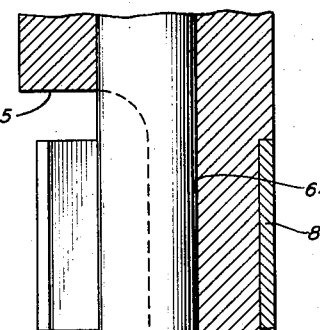
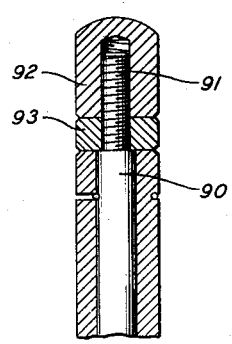
INVENTOR.
LEO J. BRANCATO
BY
ATTORNEY

United States Patent Office 2,839,823
Patented June 24, 1958

2,839,823
INSERTING TOOL FOR PUSH-IN INSERTS

Leo J. Brancato, Danbury, Conn., assignor to Heli-Coil Corporation, Danbury, Conn., a corporation of Delaware Application May 25, 1955, Serial No. 511,026

5 Claims. (Cl. 29—275)

The invention relates to an inserting tool for push-in inserts of the screw thread forming wire coil type.

Wire coil inserts are frequently used as linings of tapped holes in boss or nut members of relatively soft material in order to provide substantial strength to the screw connections of such members. The inserts in such connections are helically wound of a wire of a suitable cross-section and screwed with their outer portions into the tapped holes so as to form female threads with their inner portions. For certain uses, however, particularly in certain articles of plastic material, the wear resistant properties of a screw thread provided in a hole is of higher importance than the strength of the thread. In many instances where this is the case, it is also required that the costs are reduced as far as possible, wherefore the conventional, time and labor consuming steps of tapping a thread in a hole of the boss or nut member and, then, screwing the insert into such tapped thread, are objectionable. Nevertheless, the screw thread forming wire coil can be advantageously used in such cases if a suitable insert is pushed in the axial direction into a cylindrical hole and held there sufficiently firmly by friction.

The wire of a coil for the mentioned purpose has a cross-section preferably composed of an inner and an outer triangular portion and a rectangular portion on which the triangles are erected. In an insert of such type, the inner triangle forms the screw thread into which a member with a corresponding external thread can be screwed. The outer triangle of the coil wire cross-section bearing against the inner wall of a cylindrical hole creates a desirable high frictional resistance to a movement in the axial and the peripheral directions if the insert is originally coiled slightly oversized, and the intermediate rectangular portion provides surfaces with which the coil convolutions can bear upon one another and take up the axial thrust applied for pushing the coil into the cylindrical hole.

However, I have found that certain difficulties are encountered when an insert coil of the mentioned type is pushed home. On the one hand, care must be taken that during the application of the inserting pressure none of the coil convolutions deviates from the true axial position, on the other hand, the coil must be prevented from expanding due to the axial pressure which has to be applied.

Therefore, the object of the invention is the provision of a tool for pushing a slightly oversized wire coil insert into a cylindrical hole, wherein the tool includes means for preventing the insert from tilting and means for preventing the last convolution from springing out during the inserting process.

The invention also aims to provide a tool of the mentioned type which prevents an undue expansion of the insert coil when it is subjected to the axial inserting pressure.

Further objects and details of the invention will be apparent from the description given hereinafter and the accompanying drawing illustrating an embodiment thereof by way of example.

In the drawing,

Fig. 1 is a longitudinal cross-section of a tool according to the invention,

Fig. 2 is an end elevation thereof,

Figs. 3 and 4 are cross-sections along lines 3—3 and 4—4, respectively, of Fig. 1.

Fig. 5 is an enlarged elevation, partly in section of a portion of the tool of Fig. 1 as applied to a boss during the inserting process, Fig. 6 is an elevation similar to Fig. 5 in which, however, a modified tool is shown, and Fig. 7 is a cross-section of a modified tool head.

Referring now to the drawing, the tool illustrated in Figs. 1 to 4 comprises a tubular shell 10 in which a mandrel 12 is rotatable and axially movable. Near the foot end of the shell, a recess 13 is provided which extends through 180° of the shell periphery and lengthwise somewhat more than the longest coil to be inserted by the tool. An axial slot 14 is provided which reaches from the recess 13 to the ultimate end of the shell where a small edge-like rim 15 projects from the end face 16. This rim has an inner diameter equal to that of the end portion 17 of the shell which includes the recessed and the slotted parts. The outer surface 15' of the rim slants upward to a maximum diameter which is very much smaller than that of the face 16. The shell portion opposite the recess 13 is provided with a rather wide groove 18 in which a spring 19 is embedded and held to the shell by its radial projections 20 and 21 as clearly shown in Fig. 3. For a purpose to be explained later, a portion 22 of the spring extends from the projection 21 at an angle into the recess 13. To the free end of the portion 22 a spring wire 23 is secured e. g. by soldering so as to engage in the slot 14 and bear against the lower portion 24 of the mandrel. This portion 24 is of a slightly smaller diameter than the major mandrel portion 25. Correspondingly, the portion 17 of the shell is of a smaller inner diameter than the major shell portion 26, so that the mandrel is properly guided. The mandrel is provided with a preferably knurled head 27 which bearing against the upper end face 28 of the shell as in Fig. 1 defines the end position to which the mandrel can be shifted downward. In order to determine the opposite end position, a portion 29 of the mandrel is shaped frusto-conical so that a shoulder is formed at 30. Near the upper end of the shell, a groove 31 is provided which extends from a bore 32 around the major portion of the shell periphery to a slot 33 as clearly shown in Fig. 4. A snap ring 34 engages in the bore 32 and groove 31 and projects with its free end 35 into the slot 33 so as to bear against the mandrel. The mandrel may be provided with a shallow groove 36 opposite slot 33 in the illustrated position so that the end 35 may engage that groove in order to prevent the mandrel from shifting in relation to the shell when the tool is not in use. By turning the mandrel in the shell, the end 35 will be urged out of groove 36 so that the mandrel can be freely shifted in the axial direction. If, then, the mandrel is pulled upward, its end position is reached when the snap ring end 35 comes to bear against the shoulder 30. When, thereafter, the mandrel is pushed down, the end 35 can slide on the conical surface of the portion 29 without inhibiting such movement. The distance of the shoulder 30 from the head 27 is so selected that the lowermost end of the mandrel in its upper end position has fully cleared the recess 13.

The diameter of the lower portion 24 of the mandrel and the corresponding inner diameter of the shell portion 17 are made substantially equal to the outer diameter of a coil to be inserted by the tool. From the portion 24 a short co-axial piece 37, and from the latter a longer co-axial piece 38 extend, each with a smaller diameter than the preceding piece. The diameter of the piece 38 is very slightly smaller than the inner diameter of the insert coil after its insertion, and the shoulder 39 between the pieces 37 and 38 is of such a width that it can bear on the flat surface of the coil wire cross-section as it will be fully apparent from the description given hereinafter with reference to Fig. 5. The shoulder 39 is helically shaped in accordance with the top convolution of the coil, and has a straight step 40 which can bear against the end of a coil slipped on the piece 38.

The operation of the tool is illustrated in Fig. 5 in which a boss member 50 is provided with a cylindrical hole 51. The hole is countersunk at its upper end at 52. In order to provide the hole with an inner screw thread, a wire coil 53 is produced which has a wire cross-section as stated hereinbefore, preferably consisting of an inner and an outer triangular portion, 54 and 55, respectively, and a median rectangular portion 56. However, it will be understood that the tool according to the invention is useful for coils of suitable other wire cross-sections too. To apply the coil, the mandrel 12 of the tool is first retracted into its upper end position in which the end 35 of the snap ring 34 stops the shoulder 30. Thereby, the recess 13 is fully cleared of the mandrel and the coil 53, of adequate length and diameter, can now be inserted into the recess 13 between the spring portion 22 and the shell portion 17. Thereupon the mandrel 12 can be pushed down first so far that the end portion 38 enters the interior of the coil which comes to bear against the helical face 39 of the tool. By turning the mandrel 12, the step 40 will be brought into engagement with the upper end of the coil so that the entire top convolution of the coil bears against the helical face 39, as clearly shown in Fig. 5. The coil 53 will not turn with the mandrel before the step 40 engages the coil end and unless the mandrel is turned in the direction the coil is wound, because the spring arm 22 sets up sufficient friction to hold the coil back. The tool with the coil therein may then be set up coaxially with the hole 51 so that the edge 15 engages into the countersunk portion 52. During this operation, spring 23 assures that the coil will remain in contact with the shoulder of the mandrel when the tool is held in a vertical position and prior to the installation of the coil in the hole. Without spring 23 it might happen that the coil falls out of the sleeve as soon as the mandrel is advanced if at that time the free coil end is not yet in engagement with the hole. It will be noted that the inner diameter of the shell portion 17, which is equal to the outer diameter of the coil 53 as originally wound, is slightly larger than the diameter of the hole 51. Therefore, the countersunk portion 52 may extend a short distance downward beyond the rim 15 in order to facilitate the compression of the coil which occurs if the mandrel is now driven down to locate the coil fully in the hole 51. It has been found that it is preferable to drive the mandrel down by repeated taps on its head rather than by a continued pressure. The depth to which the coil can be driven depends on the distance the face 39 of the mandrel projects from the face 16 of the shell when the head 27 bears on the top face 28. Of course, the diameter of the portion 37 must not be larger than that of the hole 51 if the upper end of the coil shall be located underneath the countersunk portion 52. It will be clear that during the inserting operation, the coil cannot tilt nor otherwise deviate from its predetermined form, first, owing to the fact that on account of the helical shape of the face 39, the axial thrust by the mandrel is equally distributed over the entire length of the top convolution of the coil. In this connection it is to be noted that when the compression or contraction of the convolutions entering the hole 51 occurs, the convolutions which are still inside the shell 17 will lengthen somewhat. This turning, however, is directed against that step so that the entire top convolution remains in engagement with the surface 39. Secondly, the convolutions which are still inside the shell portion 17 are held co-axial with the hole 51 by that portion as the inner diameter of the latter is equal to the original outside diameter of those convolutions. Simultaneously, the shell prevents an expansion of the convolutions as a consequence of the axial compression. Thirdly, the convolutions which are contracted and are shifted in such condition down the hole are prevented from tilting or other undesired deformation by the mandrel end 38, the diameter of which equals the inner diameter of the contracted convolutions. When the inserting process is completed, the tool will be withdrawn, and the resilient coil remaining in the hole in a compressed or contacted condition will set up a frictional resistance to forces tending to move it.

In certain instances, particularly with coils of relatively large cross-section, it will be preferable to combine with the tool according to the invention, a means for contracting the coil before it enters the cylindrical hole. Such means is shown in Fig. 6 in which the mandrel 60 is provided with a helical face 61 and step 62 similar to the face 39 and step 40 in Figs. 1 and 5. An end portion 80 projects downward from the face 61 in the same manner and for the same purpose as the portion 38 in Fig. 1. The shell 63 guiding the mandrel in its part at 64 along the lateral recess 65, has a lower end 66 the inner diameter of which decreases from the size of the outer diameter of the non-contracted coil to the size of the diameter of the hole 67 in the boss 68. A sharp edged rim 69 may project downward from the end face 70 similarly to the rim 15 in Fig. 1, so as to fit into the flaring upper end 71 of the hole 67.

The modified tool according to Fig. 6 operates in substantially the same manner as the tool in Fig. 5 with the difference, however, that a coil 81 inserted in the recess 65 and held by the spring 82 will be engaged and pushed down by the mandrel 60 in the lower portion 66 of the shell 63 where the coil will be gradually contracted before it enters the hole 67. The same result can, of course, be obtained if a separate piece, similar to the lower portion 66 of the shell of Fig. 6 with suitably decreasing diameter, is inserted e. g. in Fig. 5 between the tool of Fig. 1 and the boss, provided the mandrel is made sufficiently long.

It has been stated that the depth to which a coil can be inserted depends on the distance between the face 39 in Fig. 1 from the face 16 when the mandrel head 27 bears on the shell end face 28. In order to render this distance adjustable, means may be provided e. g. as shown in Fig. 7 in which the upper end of the mandrel 90 has an externally screw threaded extension 91. The mandrel head 92 is provided with an internal thread and screwed on the extension 91. A jam nut 93 may be applied in order to secure the head 92 in an adjusted position. Other means may be provided to adapt the tool to differently sized coils. Thus, the end portions 37 and 38 may be rendered exchangeable by making them separate pieces to be screwed into the end of the mandrel as indicated at 95 in Fig. 5.

It will be apparent to those skilled in the art that many alterations and modifications of the structure shown and described may be made without departure from the spirit and essence of the invention which for that reason shall not be limited but by the scope of the appended claims.

I claim:

1. A tool for pushing a slightly oversized screw thread forming wire coil insert into a cylindrical hole while contracting said coil to the diameter of said hole, comprising a shell having a foot end, and a mandrel rotatable and axially movable in said shell so as to be retractable into and projectable from said foot end of said shell, the inner diameter of at least the lower portion of said shell being substantially equal to the outer diameter of said coil for which the tool is destined, so as to provide in said shell portion a sliding fit for the coil prior to its being contracted, the lower part of said mandrel including a first, a second and a third portion, the diameter of said second or median portion being smaller than that of said first portion which fits slidingly into said lower shell portion, and being larger than the diameter of said third or ultimate end portion whereby a shoulder is formed between said third and said second portions, said second mandrel portion being of a diameter fitting the hole into which said coil is to be inserted, and said third portion having a diameter substantially as large as but not larger than the inner diameter to which said coil is to be contracted, said shoulder having a helical face of a pitch corresponding to the pitch of said coil when its convolutions bear upon one another, and forming a step for engagement with the upper end of said coil when said third portion is introduced into the interior of said coil.

2. A tool as claimed in claim 1, said lower shell portion having an end face and including a small hollow frustro-conical extension co-axially projecting from said end face and adapted to engage a flaring end of the hole into which said coil is destined to be inserted.

3. A tool as claimed in claim 1, the wall in a part of said lower shell portion being provided with a lateral recess to receive therein said coil, and a resilient means secured to said wall so as to bear against said coil when in said recess thereby yieldingly to resist a movement of said coil received in said recess.

4. A tool for pushing a slightly oversized screw thread forming wire coil insert into a cylindrical hole while contracting said coil to the diameter of said hole, comprising a shell having a foot end, and a mandrel rotatable and axially movable in said shell so as to be retractable into and projectable from said foot end of said shell, the inner diameter of at least the lower portion of said shell being substantially equal to the outer diameter of said coil for which the tool is destined, so as to provide in said shell portion a sliding fit for the coil prior to its being contracted, the lower part of said mandrel including a first, a second and a third portion, the diameter of said second or median portion being smaller than that of said first portion which fits slidingly into said lower shell portion, and being larger than the diameter of said third or ultimate end portion whereby a shoulder is formed between said third and said second portions, said shoulder having a helical face of a pitch corresponding to the pitch of said coil when its convolutions bear upon one another, and forming a stop for engagement with the upper end of said coil when said third portion is introduced into the interior of said coil, in a portion of said shell adjacent the foot end portion thereof, the shell wall throughout half of its periphery being removed over a length somewhat more than the longest coil for which the tool is destined, so as to provide a recess, and said foot end portion being provided with a slot extending from said recess to the ultimate foot end of said shell, said tool further comprising a leaf spring secured to said adjacent portion so as to project into said recess and to retain said coil when inserted in said recess, and a spring wire secured to said leaf spring and extending in said slot so as to bear against said coil when it is pushed through said foot end portion.

5. A tool as claimed in claim 4, said shell and said mandrel including abutment means so to limit the distance said mandrel can be retracted that its foot end clears said recess.

References Cited in the file of this patent
UNITED STATES PATENTS

| | | |
|---|---|---|
| 1,647,204 | Susdorf | Nov. 1, 1927 |
| 1,863,956 | Wilson | June 21, 1932 |
| 1,966,520 | Rayner | July 17, 1934 |
| 2,316,231 | Evans | Apr. 13, 1943 |
| 2,371,622 | Hawkins | Mar. 20, 1945 |
| 2,453,840 | Geertsema | Nov. 16, 1948 |
| 2,513,792 | Forster | July 4, 1950 |